United States Patent
Wilcox et al.

(10) Patent No.: US 10,741,943 B2
(45) Date of Patent: Aug. 11, 2020

(54) NETWORK DEVICES AND NETWORK ELEMENTS WITH STACKED OCTAL SMALL FORMAT PLUGGABLE MODULES

(71) Applicant: Arista Networks, Inc., Santa Clara, CA (US)

(72) Inventors: Robert Wilcox, Santa Clara, CA (US); Richard Hibbs, Santa Clara, CA (US); Youngbae Park, Santa Clara, CA (US); Cliff Willis, Santa Clara, CA (US); Aravind Musunuri, Santa Clara, CA (US)

(73) Assignee: ARISTA NETWORKS, INC., Santa Clara, CA (US)

(*) Notice: Subject to any disclaimer, the term of this patent is extended or adjusted under 35 U.S.C. 154(b) by 35 days.

(21) Appl. No.: 16/130,883

(22) Filed: Sep. 13, 2018

(65) Prior Publication Data
US 2020/0091633 A1  Mar. 19, 2020

(51) Int. Cl.
| | |
|---|---|
| *H01R 12/55* | (2011.01) |
| *H01R 12/52* | (2011.01) |
| *H01R 12/51* | (2011.01) |
| *H01R 12/53* | (2011.01) |

(52) U.S. Cl.
CPC .......... *H01R 12/55* (2013.01); *H01R 12/515* (2013.01); *H01R 12/523* (2013.01); *H01R 12/53* (2013.01)

(58) Field of Classification Search
CPC .... H01R 12/55; H01R 12/515; H01R 12/523; H01R 12/53; H01R 12/72; H01R 13/514
USPC ......................................... 439/82, 83, 541.5
See application file for complete search history.

(56) References Cited

U.S. PATENT DOCUMENTS

| | | | |
|---|---|---|---|
| 2013/0163175 A1* | 6/2013 | Kim | G06F 1/1658 361/679.32 |
| 2017/0318673 A1* | 11/2017 | Meggitt | H05K 1/0216 |
| 2018/0299624 A1* | 10/2018 | Leigh | G02B 6/3825 |
| 2019/0207342 A1* | 7/2019 | Aden | H01R 12/724 |
| 2019/0260165 A1* | 8/2019 | Below | H01R 12/721 |

* cited by examiner

*Primary Examiner* — Abdullah A Riyami
*Assistant Examiner* — Nader J Alhawamdeh
(74) *Attorney, Agent, or Firm* — Fountainhead Law Group P.C.

(57) ABSTRACT

In one embodiment, an apparatus is provided. The apparatus includes a printed circuit board (PCB). The apparatus also includes a first dual stacked octal small format pluggable (OSFP) module coupled to the PCB on a top surface of the PCB. The first dual stacked OSFP module comprises two OSFP modules that are vertically stacked. The apparatus further includes a second dual stacked OSFP module coupled to the PCB on a bottom surface of the PCB. The second dual stacked OSFP module comprises two OSFP modules that are vertically stacked. A first bottom of the first dual stacked OSFP module is flush against the top surface of the PCB. A second bottom of the second dual stacked OSFP is flush against the bottom surface of the PCB.

14 Claims, 10 Drawing Sheets

NETWORK DEVICES AND NETWORK ELEMENTS WITH STACKED OCTAL SMALL FORMAT PLUGGABLE MODULES

BACKGROUND

Network elements, such as switches, routers, hubs, servers (e.g., rackmount servers) may include a chassis with one or more slots. Network devices (e.g., network components), such as line cards, control cards, etc., may be inserted into the slots. The network elements may perform various functions that may be used during the operation of the network element. For example, a switch may include multiple line cards that are inserted into multiple slots in the chassis of the switch. Each of the line cards may be coupled to other network elements (e.g., to ports of other switches), to other line cards within the same network element, and/or to different networks. Each network device may be coupled to a fabric of the network element via one or more connectors inside the chassis of the network element. For example, each network device may include a connector that may be coupled to another connector on a fabric or a mid-plane of the network element. The fabric may allow the different network devices to communicate data with each other. For example, the fabric may allow data received from a first port of a first line card to be communicated (e.g., routed) to a second port of a second line card.

SUMMARY

In some implementations, an apparatus is provided. The apparatus includes a printed circuit board (PCB). The apparatus also includes a first dual stacked octal small format pluggable (OSFP) module coupled to the PCB on a top surface of the PCB. The first dual stacked OSFP module includes two OSFP modules that are vertically stacked. The apparatus further includes a second dual stacked OSFP module coupled to the PCB on a bottom surface of the PCB. The second dual stacked OSFP module includes two OSFP modules that are vertically stacked. A first bottom of the first dual stacked OSFP module is flush against the top surface of the PCB. A second bottom of the second dual stacked OSFP is flush against the bottom surface of the PCB.

In some implementations, an apparatus is provided. The apparatus includes a chassis that may house a plurality of network device. The apparatus also includes a first network device housed within the chassis. The network device includes a printed circuit board (PCB). The network device also includes a first dual stacked octal small format pluggable (OSFP) module coupled to the PCB on a top surface of the PCB. The first dual stacked OSFP module includes two OSFP modules that are vertically stacked. The network device further includes a second dual stacked OSFP module coupled to the PCB on a bottom surface of the PCB. The second dual stacked OSFP module includes two OSFP modules that are vertically stacked. A first bottom of the first dual stacked OSFP module is flush against the top surface of the PCB. A second bottom of the second dual stacked OSFP is flush against the bottom surface of the PCB.

In some implementations, a method is provided. The method includes obtaining a printed circuit board (PCB). The method also includes obtaining a first dual stacked octal small format pluggable (OSFP) module. The first dual stacked OSFP module includes two OSFP modules that are vertically stacked. The method further includes obtaining a second dual stacked OSFP module. The second dual stacked OSFP module includes two OSFP modules that are vertically stacked. The method further includes coupling the first dual stacked to a top a top surface of the PCB. A first bottom of the first dual stacked OSFP module is flush against the top surface of the PCB. The method further includes coupling the second dual stacked to a bottom surface of the PCB. A second bottom of the second dual stacked OSFP is flush against the bottom surface of the PCB.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

As discussed above, network elements may include a chassis with one or more slots. Network devices, such as line cards, may be inserted into the slots. The size of the chassis may limit the number of slots and thus, the number of network devices (e.g., line cards) that may be used in a network element. Network requirements for users are constantly increasing. For example, users may want to transmit and/or receive more data, may want to transmit and/or receive data at faster speeds, may want to connect/interconnect more networks, etc. As network requirements increase, it may be useful to increase the capabilities of a network element without increasing the size of the chassis and/or without increasing the number of slots in a chassis.

Figure 1:
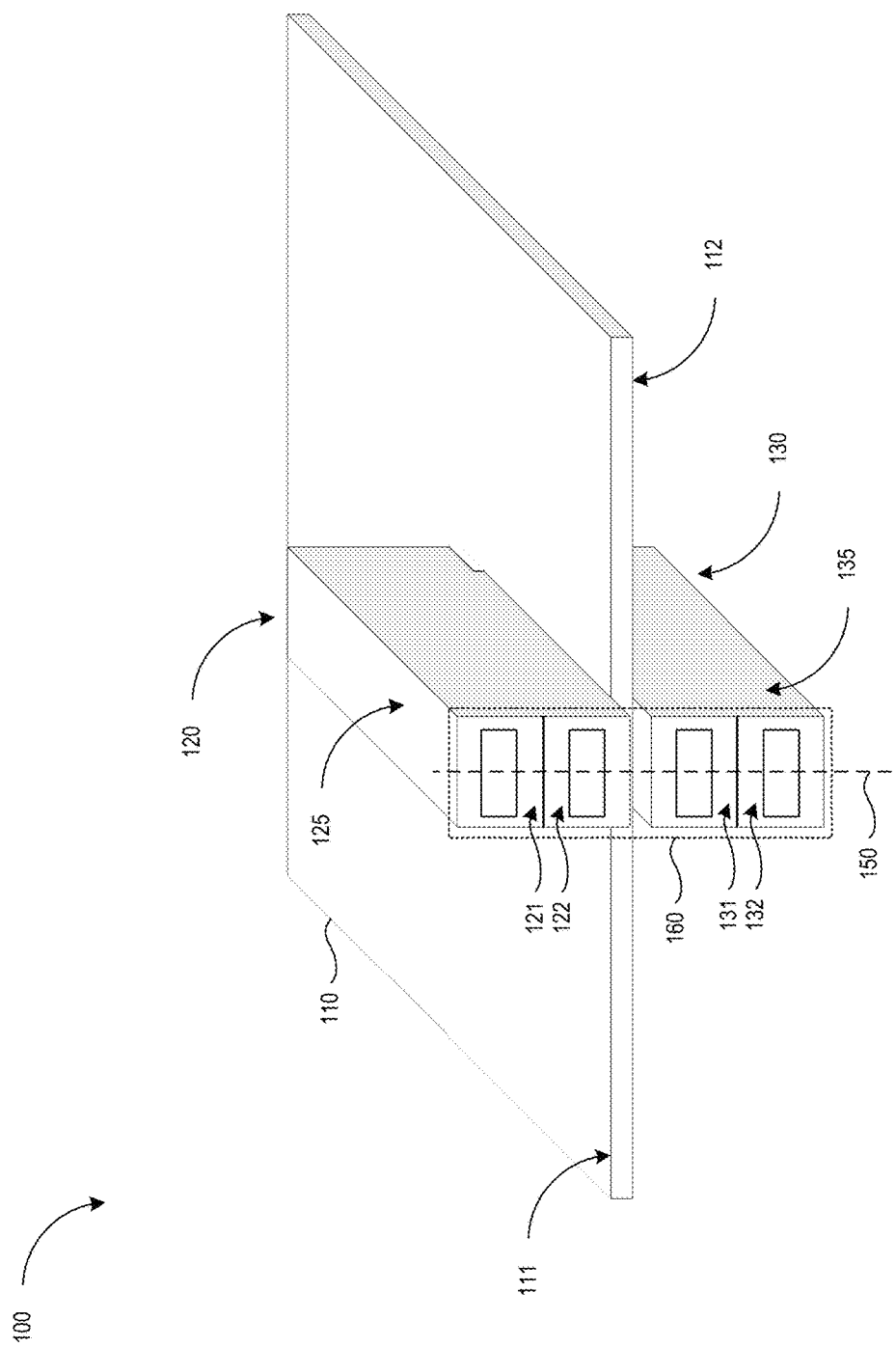
FIG. 1 illustrates a perspective view of a network device in accordance with one or more embodiments of the present disclosure.

FIG. 1 illustrates a perspective view (e.g., an isometric view) of a network device 100 in accordance with one or more embodiments of the present disclosure. The network device 100 includes a printed circuit board (PCB) 110. The PCB 110 may include a first surface 111 (e.g., a top or upper surface) and a second surface 112 (e.g., a bottom or lower surface). Various devices, components, circuits, etc., may be included in the PCB 110 (e.g., may be mounted, positioned, or located on the first surface 111 and/or the second surface 112). For example, the PCB 110 may include one or more connectors (no illustrated in FIG. 1) that may couple the network device 100 to other devices, components, etc. The one or more connectors may couple the PCB 110 (and other devices, components, circuits, etc.) to a mid-plane or a backplane of a network element (e.g., a mid-plane of a network switch). In another example, the PCB 110 may include processing devices (e.g., an applicant specific integrated circuit (ASIC), a processor, etc.) that may process and/or analyze data (e.g., packets) that may be transmitted/ received by the network device 100.

In one embodiment, the network device 100 includes a first dual stacked octal small format pluggable (OSFP) module 120 coupled to the PCB 110 on a first surface 111 of the PCB 110. The first surface 111 may be an upper surface or a top surface of the PCB 110. In other embodiments, the first surface may be a lower surface or bottom surface if the orientation of the network device 100 is reversed (e.g., if the network device 100 is flipped upside down). The first dual stacked OSFP module 120 includes two OSFP modules that are vertically stacked. For example, the first dual stacked OSFP module 120 may include a first OSFP module 121 that is positioned and/or located above a second OSFP module 122. In another example, the first OSFP module 121 and the second OSFP module 121 may be aligned along a same vertical axis. The first OSFP module 121 and the second OSF module 122 may be located within a housing 125 for the first dual stacked OSFP module 120 (e.g., with a single housing, within the same housing, etc.).

In one embodiment, the network device 100 includes a second dual stacked octal small format pluggable (OSFP) module 130 coupled to the PCB 110 on a second surface 112 of the PCB 110. The second surface 112 may be a lower surface or a bottom surface of the PCB 110. In other embodiments, the second surface may be a top surface or upper surface if the orientation of the network device 100 is reversed (e.g., if the network device 100 is flipped upside down). The second dual stacked OSFP module 130 includes two OSFP modules that are vertically stacked. For example, the second dual stacked OSFP module 130 may include a first OSFP module 131 that is positioned and/or located above a second OSFP module 132. In another example, the first OSFP module 131 and the second OSFP module 131 may be aligned along a same vertical axis. The first OSFP module 131 and the second OSF module 132 may be located within a housing 135 for the second dual stacked OSFP module 130.

In some embodiments, a stacked OSFP module may include any number of OSFP modules that are located above each other. For example, a stacked OSFP module may include a first OSFP module located above a second OSFP module, where a first horizontal dimension of the first OSFP module (e.g., the width of the first OSFP module) overlaps with a second horizontal dimension of the second OSFP module (e.g., the width of the second OSFP module). Thus, the OSFP modules in a dual stacked OSFP module may not be centered with each other (e.g., the centers of the OSFP modules may not be aligned with each other).

In one embodiment, the bottom of the first dual stacked OSFP module 120 may be flush and/or parallel with the top surface 111 of the PCB 110. For example, at least a portion of the bottom of the housing 125 for the first dual stacked OSFP module 120 may be positioned flush with and/or parallel to the top surface 111 of the PCB 110, as discussed in more detail below. In another embodiment, the bottom of the second dual stacked OSFP module 130 may be flush and/or parallel with the bottom surface 112 of the PCB 110.

For example, at least a portion of the bottom of the housing 135 for the second dual stacked OSFP module 130 may be positioned flush with and/or parallel to the bottom surface 112 of the PCB 110. A stacked OSFP module may be flush with the a surface of the PCB 110 if a portion of the stacked OSFP module (e.g., a portion of the housing) is touching the PCB 110, in contact with the PCB 110, even or level with a surface of the PCB 110, parallel with a surface of the PCB 110, etc.

In one embodiment, a first center of the first dual stacked OSFP module 120 may be aligned with a second center of the second dual stacked OSFP module 130 along a same vertical axis and/or vertical plane. For example, as illustrated by line 150, the center of the first dual stacked OSFP module 120 may be aligned with the center of the second dual stacked OSFP module 130. The vertical axis (illustrated by line 150) and/or the vertical plane may divide each of the first dual stacked OSFP module 120 and the second dual stacked OSFP module 130 in half.

In one embodiment, the first dual stacked OSFP module 120 and the second dual stacked OSFP module 130 may form a column 160. The column 160 may include four OSFP modules. For example, the column 160 may include two OSFP modules from the first dual stacked OSFP module 120 and may include two OSFP modules from the second dual stacked OSFP module 130 for a total of four OSFP modules. The orientation of the first dual stacked OSFP module 120 and the second dual stacked OSFP module 130 in the column 160 may be referred as a belly-to-belly orientation because the bottoms of the housings 125 and 135 are positioned adjacent to each other.

In one embodiment, the first dual stacked OSFP module 120 and the second dual stacked OSFP module 130 may be coupled to the PCB 110 using surface mount connections and/or surface mount technologies. For example, pins, wires, traces, cables, lines, etc., of the first dual stacked OSFP module 120 may be coupled to pads, pins, lines, or solder balls (e.g., ball grid arrays (BGAs)) that are on the first surface 111 of the PCB 110. The surface mount connections may be coupled to other wires, pins, traces, cables, devices, components, circuits, etc., that are within or coupled to the PCB 110.

In one embodiment, the first dual stacked OSFP module 120 and the second dual stacked OSFP module 130 may be identical. The second dual stacked OSFP module 130 may be flipped over which allows the second dual stacked OSFP module 130 to be coupled to the second surface 112 of the PCB 110. Because the first dual stacked OSFP module 120 and the second dual stacked OSFP module 130 may be identical, a first set of surface mount connections (e.g., pads, BGAs, etc.) for the first dual stacked OSFP module 120 on the first surface 111 may be a reverse image of a second set of surface mount connections for the second dual stacked OSFP module 130 on the second surface 112.

In one embodiment, the first dual stacked OSFP module 120 and the second dual stacked OSFP module 130 may be coupled to the PCB 110 using vias through the PCB 110. Vias may be holes, openings, apertures, etc., that that go partially and/or completely through the PCB 110. The vias may include a conductive material, surface, and/or coating (e.g., a metallic surface/coating) that may be used to electrically and/or thermally couple connection pins of the first dual stacked OSFP module 120 and the second dual stacked OSFP module 130 to other wires, pins, traces, cables, devices, components, circuits, etc., that are within or coupled to the PCB 110. A first set of connection pins for the first dual stacked OSFP module 120 may align with a first set of vias of the PCB and a second set of connection pins for the second dual stacked OSFP module 130 may align with the second set of vias of the PCB 110, as discussed in more detail below.

In some embodiments, the first set of vias (coupled to the first dual stacked OSFP module 120) and the second set of vias (coupled to the second dual stacked OSFP module 130) may be offset from each other. For example, the first set of vias may be located to the left, right, top, or bottom of the second set of vias, as discussed in more detail below.

In one embodiment, one of the first dual stacked OSFP module 120 and the second dual stacked OSFP module 130 may be coupled to the PCB 110 using surface mount connections and the other of the first dual stacked OSFP module 120 and the second dual stacked OSFP module 130 may be coupled to the PCB 110 using vias.

As illustrated in FIG. 1, the front of the first dual stacked OSFP module 120 and front of the second dual stacked OSFP module 130 may protrude outward from the edge of the PCB 110. In other embodiments, the first dual stacked OSFP module 120 and the second dual stacked OSFP module 130 may be positioned differently. For example, the fronts of the first dual stacked OSFP module 120 and the second dual stacked OSFP module 130 may be flush with the edge of the PCB 110. In another example the fronts of the first dual stacked OSFP module 120 and the second dual stacked OSFP module 130 may be within the outer edges of the PCB 110.

Although two dual stacked OSFP modules are illustrated and discussed herein, any number of dual stacked OSFP modules may be coupled to the PCB 110 in other embodiments. For example, there may be seven dual stacked OSFP modules coupled to the first surface 111 of the PCB 110 and seven dual stacked OSFP modules coupled to the first surface 112 of the PCB 110. In addition, although dual stacked OSFP modules are illustrated and discussed herein, a stacked OSFP module may include more than two OSFP modules in other embodiments. For example, a stacked OSFP module may include three, eight, or any appropriate number of OSFP modules in other embodiments.

As discussed above, network element (e.g., network element 900 illustrated in FIG. 9) may include a chassis with one or more slots. Network devices, such as line cards, may be inserted into the slots. The size of the chassis may limit the number of slots and thus, the number of network devices (e.g., line cards) that may be used in a network element. As network requirements increase, it may be useful to increase the capabilities of a network element without increasing the size of the chassis and/or without increasing the number of slots in a chassis. The embodiments, examples, and/or implementations described herein allow for stacked OSFP modules to be coupled to a PCB in a belly-to-belly orientation. This may allow for the capabilities and/or capacity of a network device to be increased without increasing the number of network devices or slots in a network element. For example, by arranging the stacked OSFP modules in a belly-to-belly orientation/configuration, the number of OFSP modules on a network device may be doubled, which may increase the capacity/capabilities of the network device. In addition, this may also decrease the cost to manufacture the network device (e.g., a line card) because a single PCB may be used for the stacked OSFP modules, rather than using two PCBs. Reducing the number of PCBs used may also decrease the cost to manufacture a network element (e.g., a network switch) because fewer connectors may be used to couple the PCBs to the network element. This may also reduce the complexity of the network element (e.g., reduce the number of wires, pins, traces, connectors, etc., that may be used in the network element).

Figure 2:
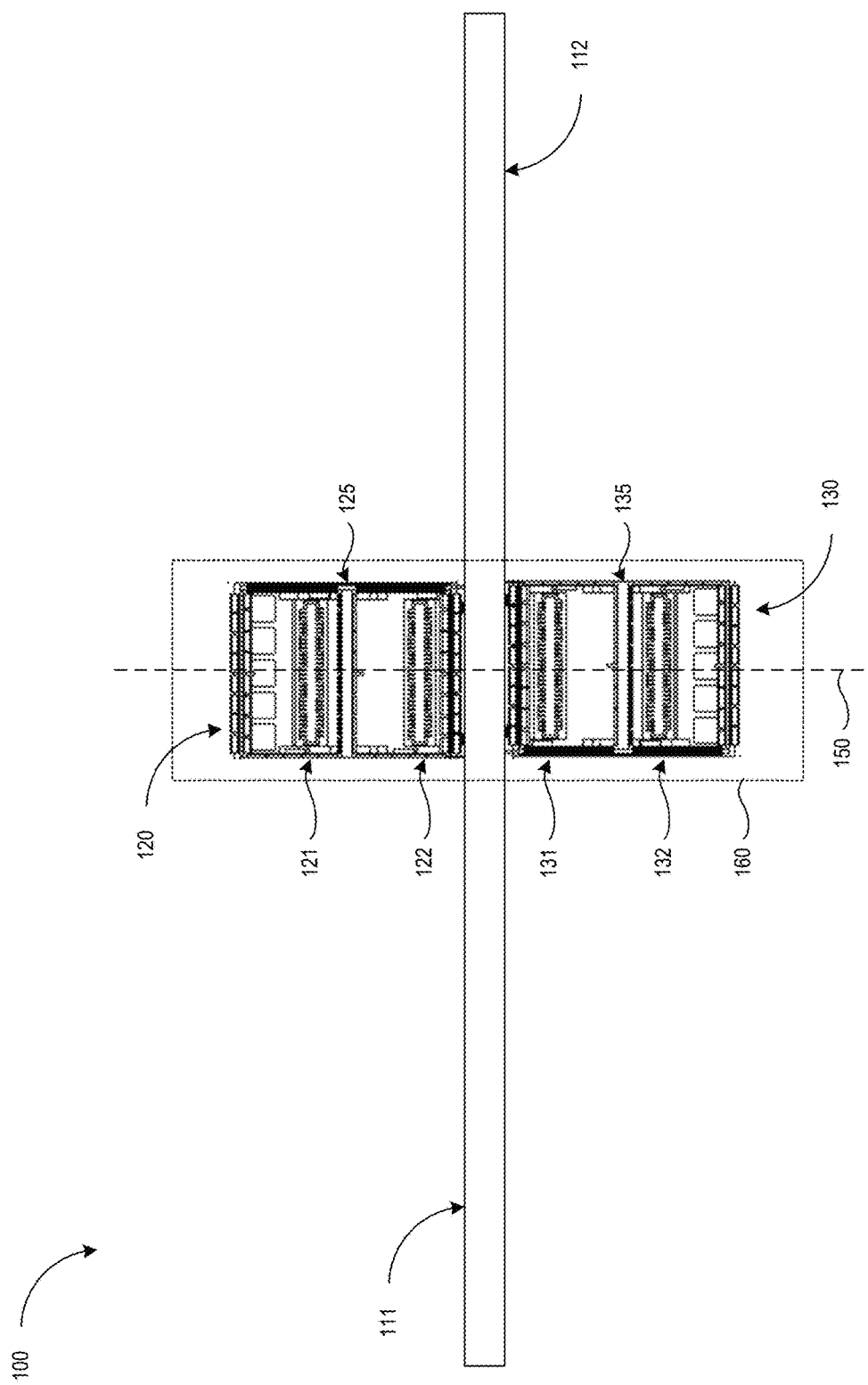
FIG. 2 illustrates a front view of a network device in accordance with one or more embodiments of the present disclosure.

FIG. 2 illustrates a front view of a network device 100 in accordance with one or more embodiments of the present disclosure. The network device 100 includes a PCB 110 that includes a first surface 111 and a second surface 112. Various devices, components, circuits, etc., may be included in and/or coupled to the PCB 110. The network device 100 includes a first dual stacked OSFP module 120 coupled to the PCB 110 on the first surface 111 and a second dual stacked OSFP module 130 coupled to the PCB 110 on a second surface 112. The first dual stacked OSFP module 120 and the second dual stacked OSFP module 130 each include two OSFP modules (OSFP modules 122 and 122, and OSFP modules 131 and 132, respectively) that are vertically stacked, as discussed above.

At least a portion of the bottom of the first dual stacked OSFP module 120 (e.g., at least a portion of the housing 125) may be flush and/or parallel with the top surface 111 of the PCB 110. At least a portion of the bottom of the second dual stacked OSFP module 130 (e.g., at least a portion of the housing 135) may be positioned flush with and/or parallel to the bottom surface 112 of the PCB 110. A first center of the first dual stacked OSFP module 120 may be aligned with a second center of the second dual stacked OSFP module 130 along a same vertical axis and/or vertical plane, as illustrated by line 150. The first dual stacked OSFP module 120 and the second dual stacked OSFP module 130 may form a column 160 that includes four OSFP modules. The orientation of the first dual stacked OSFP module 120 and the second dual stacked OSFP module 130 in the column 160 may be referred as a belly-to-belly orientation/configuration because the bottoms of the housings 125 and 135 are positioned adjacent to each other.

In one embodiment, the first dual stacked OSFP module 120 and the second dual stacked OSFP module 130 may be coupled to the PCB 110 using surface mount connections and/or surface mount technologies, as discussed above. In another embodiment, the first dual stacked OSFP module 120 and the second dual stacked OSFP module 130 may be coupled to the PCB 110 using vias through the PCB 110, as discussed above. In a further embodiment, one of the first dual stacked OSFP module 120 and the second dual stacked OSFP module 130 may be coupled to the PCB 110 using surface mount connections and the other of the first dual stacked OSFP module 120 and the second dual stacked OSFP module 130 may be coupled to the PCB 110 using vias.

The first dual stacked OSFP module 120 and the second dual stacked OSFP module 130 may be positioned on the PCB 110 in various configurations (e.g., flush against the edge of the PCB 110, protruding from the edge of the PCB 110, etc.). The number of OSFP modules in a stacked OSFP module and the number of stacked OSFP modules may vary in different embodiments, as discussed above.

Figure 3:
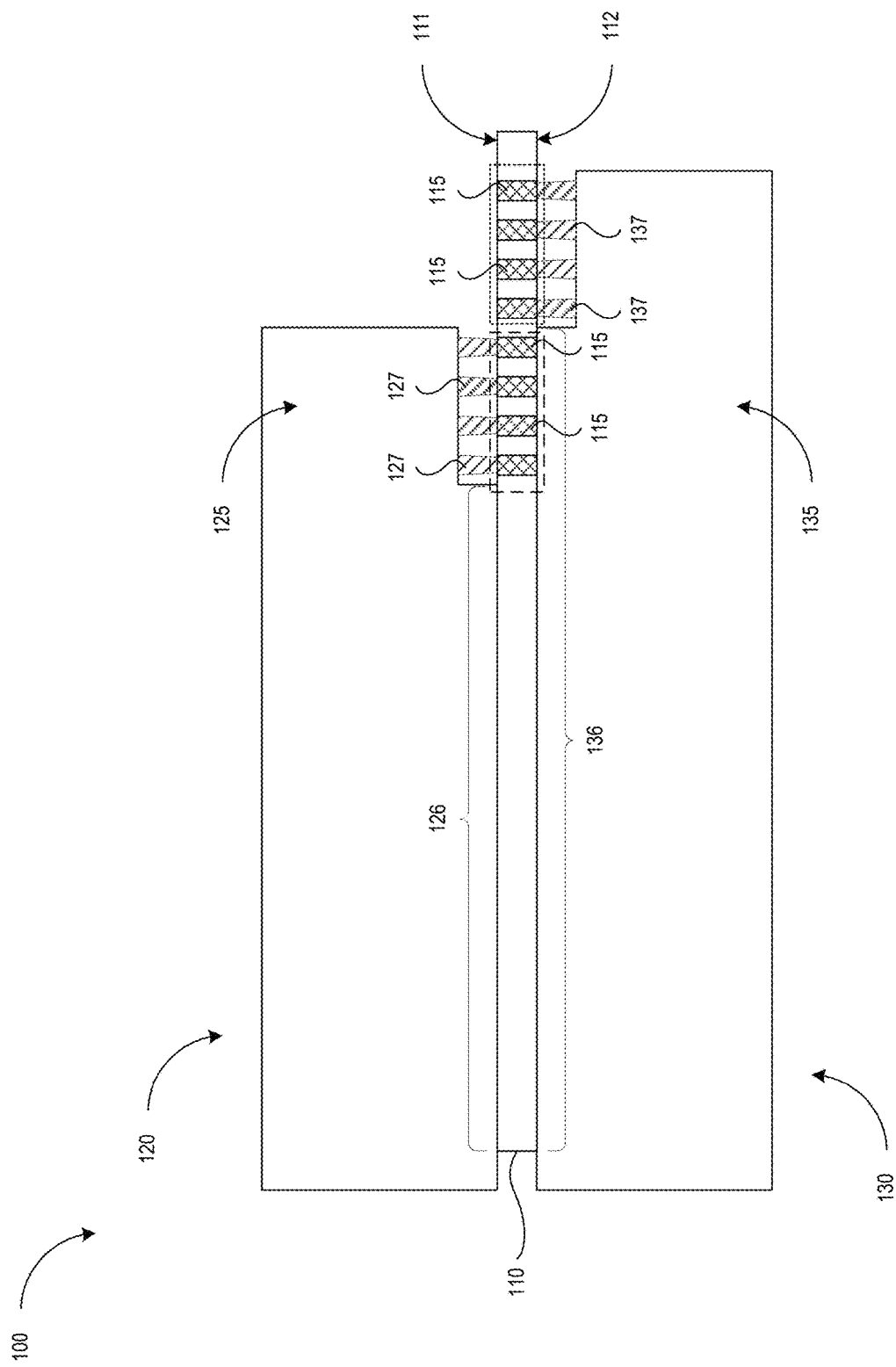
FIG. 3 is a side view of a network device in accordance with one or more embodiments of the present disclosure.

FIG. 3 is a side view of a network device 100 in accordance with one or more embodiments of the present disclosure. The network device 100 includes a PCB 110 that includes a first surface 111 and a second surface 112. Various devices, components, circuits, etc., may be included in and/or coupled to the PCB 110. The network device 100 includes a first dual stacked OSFP module 120 coupled to the PCB 110 on the first surface 111 and a second dual stacked OSFP module 130 coupled to the PCB 110 on a second surface 112. The first dual stacked OSFP module 120 and the second dual stacked OSFP module 130 each include two OSFP modules that are vertically stacked, as discussed above. A portion 126 of the bottom of the first dual stacked OSFP module 120 (e.g., at least a portion of the housing 125) may be flush and/or parallel with the top surface 111 of the PCB 110. A portion 136 of the bottom of the second dual stacked OSFP module 130 (e.g., at least a portion of the housing 135) may be positioned flush with and/or parallel to the bottom surface 112 of the PCB 110.

As discussed above, the first dual stacked OSFP module 120 and the second dual stacked OSFP module 130 may be coupled to the PCB 110 using vias 115. The vias 115 may include a conductive material, surface, coating, etc. that may be used to electrically and/or thermally couple connection pins 127 of the first dual stacked OSFP module 120 and connection pins 137 of the second dual stacked OSFP module 130 to other wires, pins, traces, cables, devices, components, circuits, etc., that are within or coupled to the PCB 110. The connection pins 127 for the first dual stacked OSFP module 120 may align with a first set of the vias 115 of the PCB (illustrated by the dashed rectangle) and the connection pins 137 for the second dual stacked OSFP module 130 may align with a second set of the vias 115 of the PCB 110 (illustrated by the dotted rectangle), as illustrated in FIG. 3. When the first dual stacked OSFP module 120 is coupled to the PCB 110, at least portions of the connection pins 127 may be inserted into the first set of the vias 115. When the second dual stacked OSFP module 130 is coupled to the PCB 110, at least portions of the connection pins 137 may be inserted into the second set of the vias 115.

As illustrated in FIG. 3, the first set of the vias 115 may be offset from the second set of the vias 115. For example, in the side view illustrated in FIG. 3, the first set of the vias 115 (illustrated by the dashed rectangle) is to the left of the second set of the vias 115 (illustrated by the dotted rectangle). The offset of the first set of the vias 115 and the second set of the vias 115 allows the first dual stacked OSFP module 120 and the second dual stacked OSFP module 130 to be coupled to the PCB 110 using press-fitting.

In addition, because the first set of the vias 115 may be offset from the second set of the vias 115 the housing 135 may be longer than the housing 125. The different lengths of the housings 125 and 135 may allow the connection pins 127 and 137 to be properly aligned with the vias 115. For example, the length of the housing 125 allows the connection pins 127 to be aligned with the first set of the vias 115 and the length of the housing 135 allows the connection pins 137 to be aligned with the second set of the vias 115.

Figure 4:
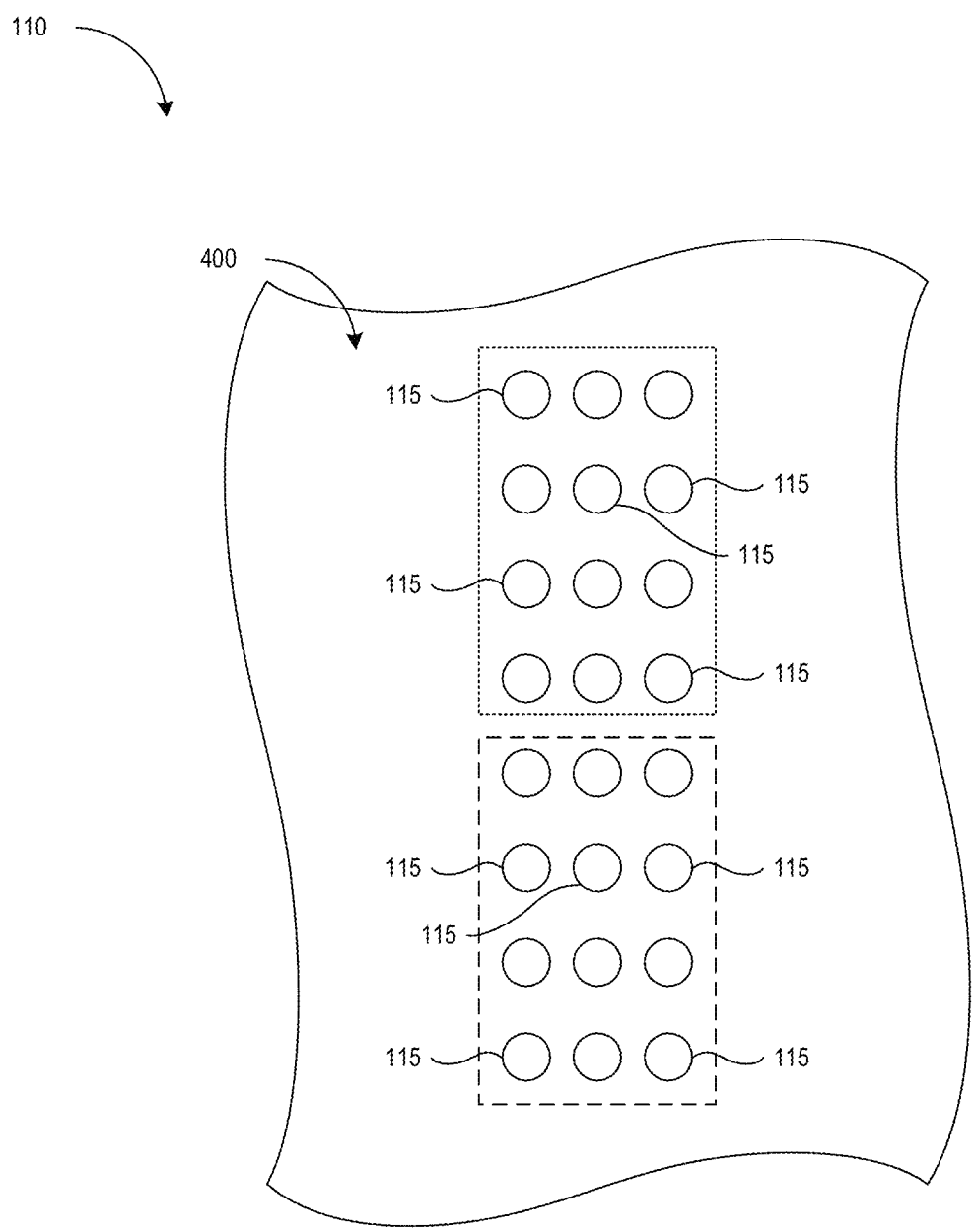
FIG. 4 is an overhead view of a portion of a printed circuit board (PCB) in accordance with one or more embodiments of the present disclosure.

FIG. 4 is an overhead view of a portion 400 of a printed circuit board (PCB) 110 in accordance with one or more embodiments of the present disclosure. As discussed above, a first dual stacked OSFP module and a second dual stacked OSFP module may be coupled to the PCB 110 using vias 115. The vias 115 may include a conductive material, surface, coating, etc. that may be used to electrically and/or thermally couple connection pins of the first dual stacked OSFP module and the second dual stacked OSFP module to other wires, pins, traces, cables, devices, components, circuits, etc., that are within or coupled to the PCB 110. The connection pins for the first dual stacked OSFP module may align with a first set of the vias 115 of the PCB (illustrated by the dashed rectangle) and the connection pins for the second dual stacked OSFP module may align with a second set of the vias 115 of the PCB 110 (illustrated by the dotted rectangle). When the first dual stacked OSFP module is coupled to the PCB 110, at least portions of the connection pins may be inserted into the first set of the vias 115. When the second dual stacked OSFP module is coupled to the PCB 110, at least portions of the connection pins may be inserted into the second set of the vias 115. As illustrated in FIG. 4, the first set of the vias 115 may be offset from the second set of the vias 115. For example, in the overhead view illustrated in FIG. 4, the first set of the vias 115 (illustrated by the dashed rectangle) is below the second set of the vias 115 (illustrated by the dotted rectangle). The offset of the first set of the vias 115 and the second set of the vias 115 allows the first dual stacked OSFP module and the second dual stacked OSFP module to be coupled to the PCB 110 using press-fitting.

Figure 5:
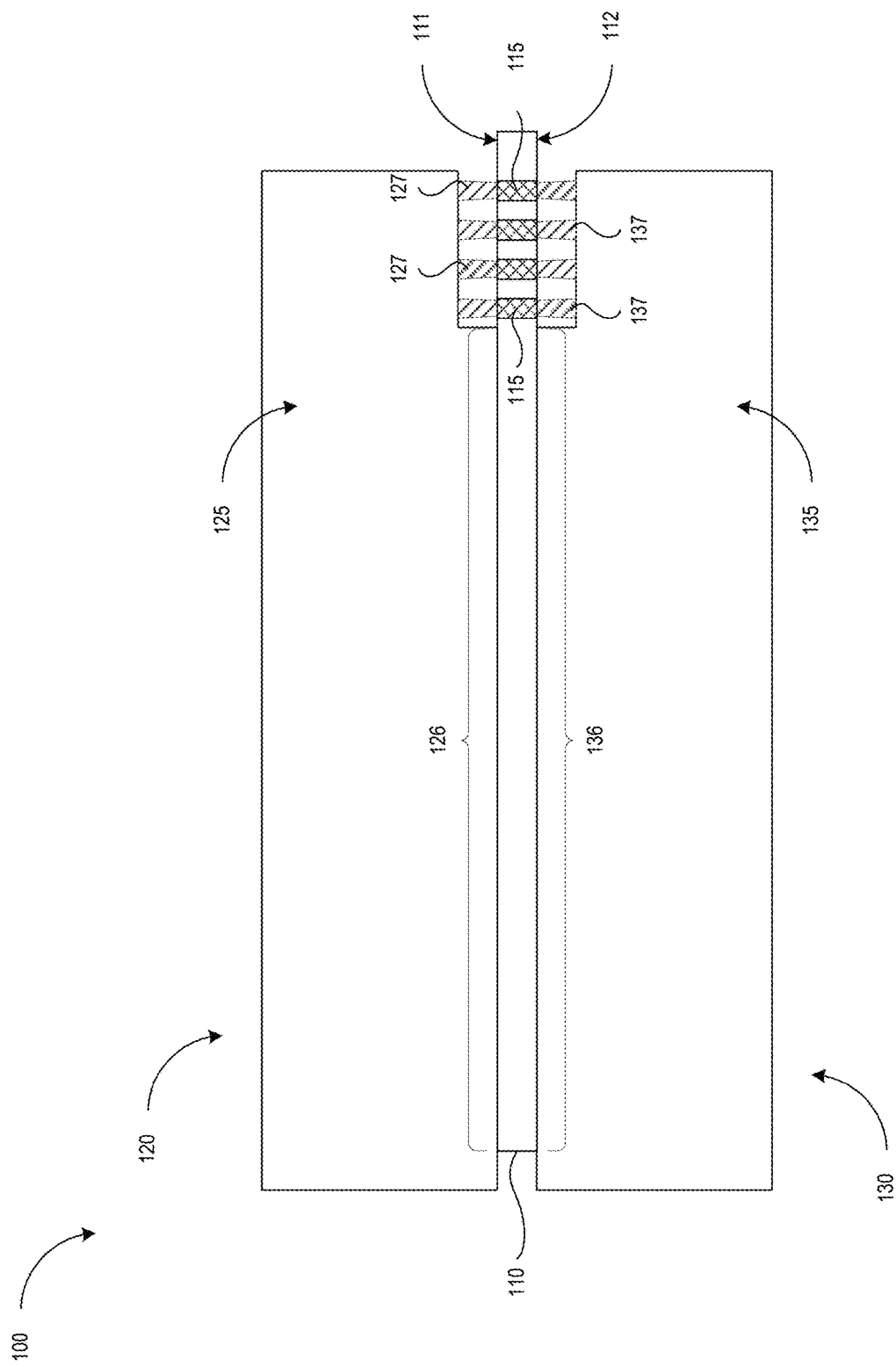
FIG. 5 is a side view of a network device in accordance with one or more embodiments of the present disclosure.

FIG. 5 is a side view of a network device 100 in accordance with one or more embodiments of the present disclosure. The network device 100 includes a PCB 110 that includes a first surface 111 and a second surface 112. Various devices, components, circuits, etc., may be included in and/or coupled to the PCB 110. The network device 100 includes a first dual stacked OSFP module 120 coupled to the PCB 110 on the first surface 111 and a second dual stacked OSFP module 130 coupled to the PCB 110 on a second surface 112. The first dual stacked OSFP module 120 and the second dual stacked OSFP module 130 each include two OSFP modules (or more) that are vertically stacked, as discussed above. A portion 126 of the bottom of the first dual stacked OSFP module 120 (e.g., at least a portion of the housing 125) may be flush and/or parallel with the top surface 111 of the PCB 110. A portion 136 of the bottom of the second dual stacked OSFP module 130 (e.g., at least a portion of the housing 135) may be positioned flush with and/or parallel to the bottom surface 112 of the PCB 110.

As discussed above, the first dual stacked OSFP module 120 and the second dual stacked OSFP module 130 may be coupled to the PCB 110 using vias 115. The vias 115 may include a conductive material, surface, coating, etc. that may be used to electrically and/or thermally couple connection pins 127 of the first dual stacked OSFP module 120 and connection pins 137 of the second dual stacked OSFP module 130 to other wires, pins, traces, cables, devices, components, circuits, etc., that are within or coupled to the PCB 110. The connection pins 127 for the first dual stacked OSFP module 120 may align with a first set of the vias 115 of the PCB and the connection pins 137 for the second dual stacked OSFP module 130 may align with a second set of the vias 115 of the PCB 110, as discussed above. When the first dual stacked OSFP module 120 is coupled to the PCB 110, at least portions of the connection pins 127 may be inserted into the first set of the vias 115. When the second dual stacked OSFP module 130 is coupled to the PCB 110, at least portions of the connection pins 137 may be inserted into the second set of the vias 115.

Figure 6:
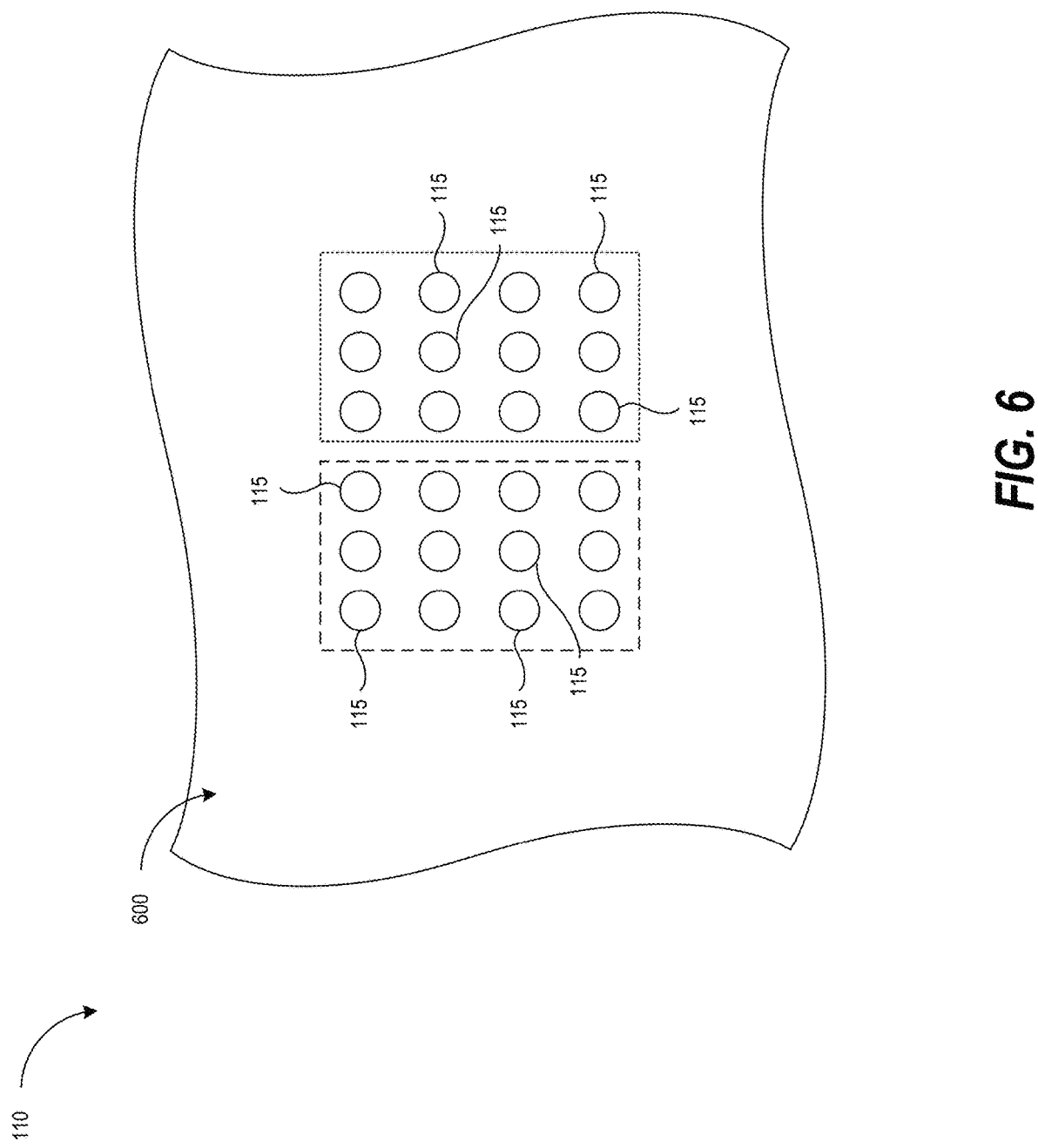
FIG. 6 is an overhead view of a portion of a printed circuit board (PCB) in accordance with one or more embodiments of the present disclosure.

As discussed above, the first set of the vias 115 may be offset from the second set of the vias 115. For example, the first set of the vias 115 may be to the right or to the left of the second set of the vias 115, as illustrated in FIG. 6. The offset of the first set of the vias 115 and the second set of the vias 115 allows the first dual stacked OSFP module 120 and the second dual stacked OSFP module 130 to be coupled to the PCB 110 using press-fit. Because the first set of the vias 115 is offset to the side of the second set of the vias 115, this may allow the housings 125 and 135 to be the same length while keeping the connection pins 127 and 137 properly aligned with the vias 115.

FIG. 6 is an overhead view of a portion 600 of printed circuit board (PCB) 110 in accordance with one or more embodiments of the present disclosure. As discussed above, a first dual stacked OSFP module and a second dual stacked OSFP module may be coupled to the PCB 110 using vias 115. The vias 115 may include a conductive material, surface, coating, etc. that may be used to electrically and/or thermally couple connection pins of the first dual stacked OSFP module and the second dual stacked OSFP module to other wires, pins, traces, cables, devices, components, circuits, etc., that are within or coupled to the PCB 110. The connection pins for the first dual stacked OSFP module may align with a first set of the vias 115 of the PCB (illustrated by the dashed rectangle) and the connection pins for the second dual stacked OSFP module may align with a second set of the vias 115 of the PCB 110 (illustrated by the dotted rectangle). When the first dual stacked OSFP module is coupled to the PCB 110, at least portions of the connection pins may be inserted into the first set of the vias 115. When the second dual stacked OSFP module is coupled to the PCB 110, at least portions of the connection pins may be inserted into the second set of the vias 115. As illustrated in FIG. 6, the first set of the vias 115 may be offset from the second set of the vias 115. For example, in the overhead view illustrated in FIG. 6, the first set of the vias 115 (illustrated by the dashed rectangle) is to the left of the second set of the vias 115 (illustrated by the dotted rectangle). The offset of the first set of the vias 115 and the second set of the vias 115 allows the first dual stacked OSFP module and the second dual stacked OSFP module to be coupled to the PCB 110 using press-fitting. This also allows the housings of the first dual stacked OSFP module and the second dual stacked OSFP module to be the same length while keeping the connection pins 127 and 137 properly aligned with the vias 115.

Figure 7:
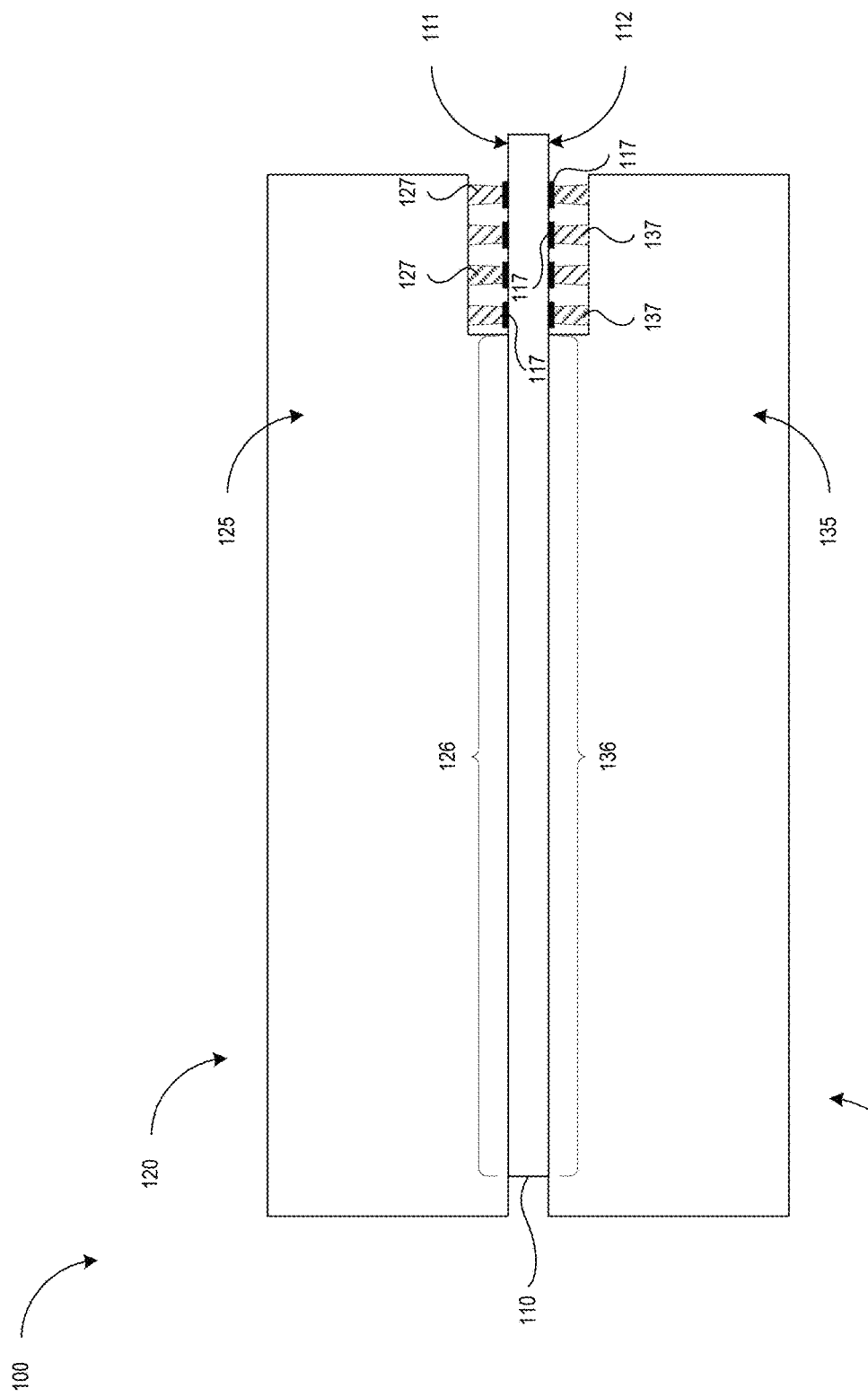
FIG. 7 is a side view of a network device in accordance with one or more embodiments of the present disclosure.

FIG. 7 is a side view of a network device 100 in accordance with one or more embodiments of the present disclosure. The network device 100 includes a PCB 110 that includes a first surface 111 and a second surface 112. Various devices, components, circuits, etc., may be included in and/or coupled to the PCB 110. The network device 100 includes a first dual stacked OSFP module 120 coupled to the PCB 110 on the first surface 111 and a second dual stacked OSFP module 130 coupled to the PCB 110 on a second surface 112. The first dual stacked OSFP module 120 and the second dual stacked OSFP module 130 each include two OSFP modules (or more) that are vertically stacked, as discussed above. A portion 126 of the bottom of the first dual stacked OSFP module 120 (e.g., at least a portion of the housing 125) may be flush and/or parallel with the top surface 111 of the PCB 110. A portion 136 of the bottom of the second dual stacked OSFP module 130 (e.g., at least a portion of the housing 135) may be positioned flush with and/or parallel to the bottom surface 112 of the PCB 110.

As discussed above, the first dual stacked OSFP module 120 and the second dual stacked OSFP module 130 may be coupled to the PCB 110 using pads 117 (e.g., contact pads, solder pads, etc.). The pads 117 are one example of surface mount connections that may be included in the PCB 110. Other surface mount connections (e.g., BGAs) may be used in other embodiments. The pads 117 may include a conductive material (e.g., a solder material) that may be used to electrically and/or thermally couple connection pins 127 of the first dual stacked OSFP module 120 and connection pins 137 of the second dual stacked OSFP module 130 to other wires, pins, traces, cables, devices, components, circuits, etc., that are within or coupled to the PCB 110. The connection pins 127 for the first dual stacked OSFP module 120 may align with a first set of the pads 117 on the first surface 111 of the PCB and the connection pins 137 for the second dual stacked OSFP module 130 may align with a second set of the pads 117 on the second surface 112 of the PCB 110, as discussed above. When the first dual stacked OSFP module 120 is coupled to the PCB 110, at least portions of the connection pins 127 may contact or touch the first set of the pads 117. When the second dual stacked OSFP module 130 is coupled to the PCB 110, at least portions of the connection pins 137 may contact or touch the second set of the pads 117.

Figure 8:
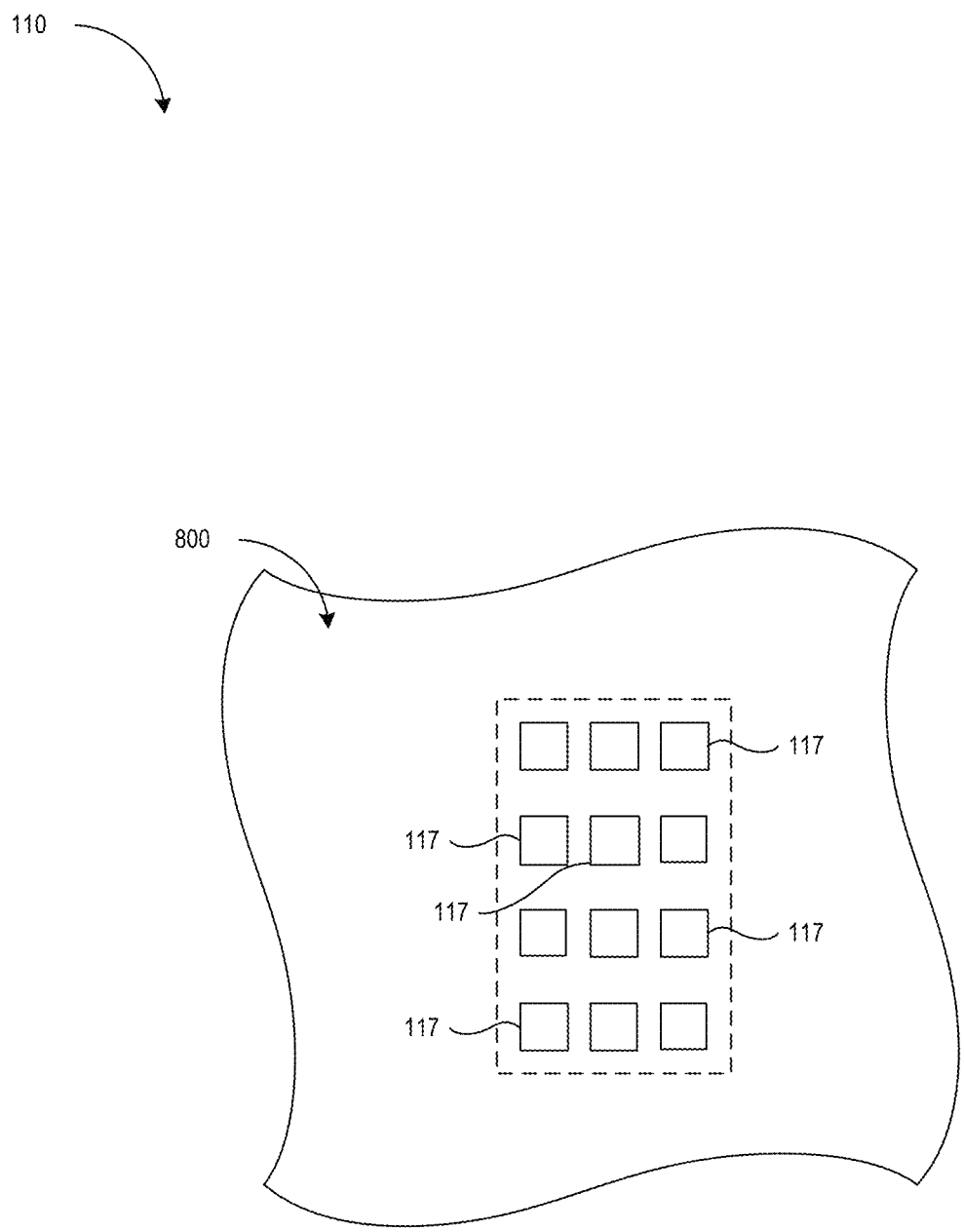
FIG. 8 is an overhead view of a portion of a printed circuit board (PCB) in accordance with one or more embodiments of the present disclosure.

FIG. 8 is an overhead view of a portion 800 of a printed circuit board (PCB) 110 in accordance with one or more embodiments of the present disclosure. As discussed above, a first dual stacked OSFP module and a second dual stacked OSFP module may be coupled to the PCB 110 using pads 117. The pads 117 may include a conductive material that may be used to electrically and/or thermally couple connection pins of the first dual stacked OSFP module and the second dual stacked OSFP module to other wires, pins, traces, cables, devices, components, circuits, etc., that are within or coupled to the PCB 110. The connection pins for the first dual stacked OSFP module may align with the pads 117 on the first surface 111 of the PCB 110 and the connection pins for the second dual stacked OSFP module may align with the pads 117 on the second surface 112 of the PCB 110. When the first dual stacked OSFP module is coupled to the PCB 110, at least portions of the connection pins may contact or touch the pads 117 on the first surface 111. When the second dual stacked OSFP module is coupled to the PCB 110, at least portions of the connection pins may contact or touch the pads 117 on the second surface 112. The pads 117 may be located in the same region or portion of the PCB 110, but on different surfaces. For example, a first set of the pads 117 may be located on the first surface 111 in the same region, portion, area, etc., as a second set of pads located on the second surface 112. Because the pads 117 may be located in the same region/portion of the PCB, this also allows the housings of the first dual stacked OSFP module and the second dual stacked OSFP module to be the same length while keeping the connection pins 127 and 137 properly aligned with the pads 117.

Figure 9:
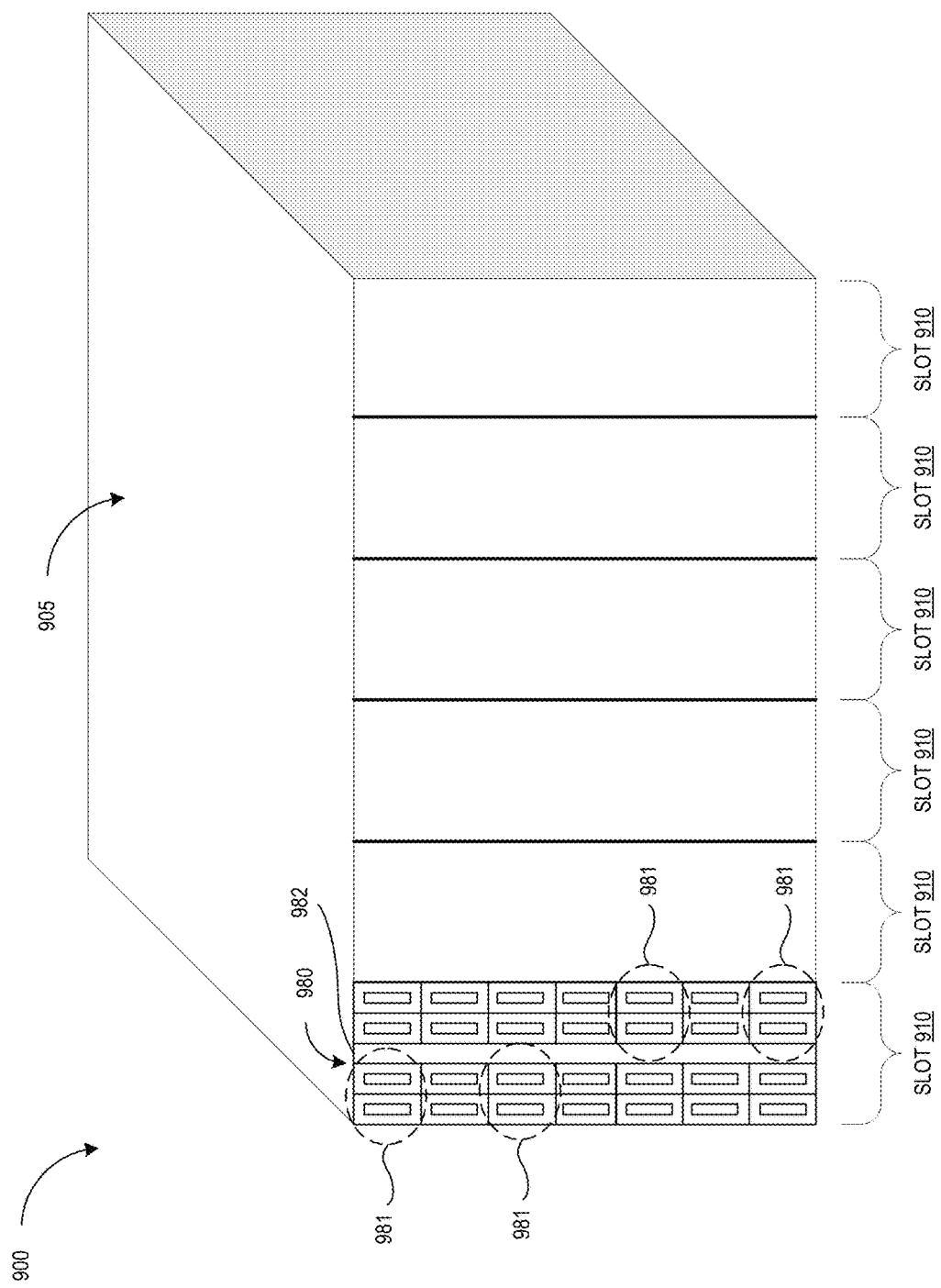
FIG. 9 is a perspective view of a network element in accordance with one or more embodiments of the present disclosure.

FIG. 9 is a perspective view of a network element 900 in accordance with one or more embodiments of the present disclosure. The network element 900 includes a chassis 905. The chassis 905 may enclose network devices (e.g., line cards, control cards, etc.) and/or other components of the network device 980 (e.g., circuits, processing devices, memory, circuit boards, power supplies, etc.). The chassis 105 may also enclose (fully or partially) the network device 980 (e.g., a line card). The network device 100 includes multiple slots 910. A network device (e.g., a line card such as network device 100 illustrated above, etc.) may be inserted into each of the slots 910. As illustrated in FIG. 9, the network device 980 a PCB 982 and a plurality of stacked OSFP modules 981 coupled to the PCB 982 (similar to network device 100 illustrated above). Each stacked OSFP module includes two OSFP modules, as discussed above. The network device 980 includes seven rows of stacked OSFP modules, with each row of stacked OSFP modules including a total of four OSFP modules. The orientation of the first dual stacked OSFP module 120 and the second dual stacked OSFP module 130 in each row may be referred as a belly-to-belly orientation because the bottoms of the housings and are positioned adjacent to each other.

Figure 10:
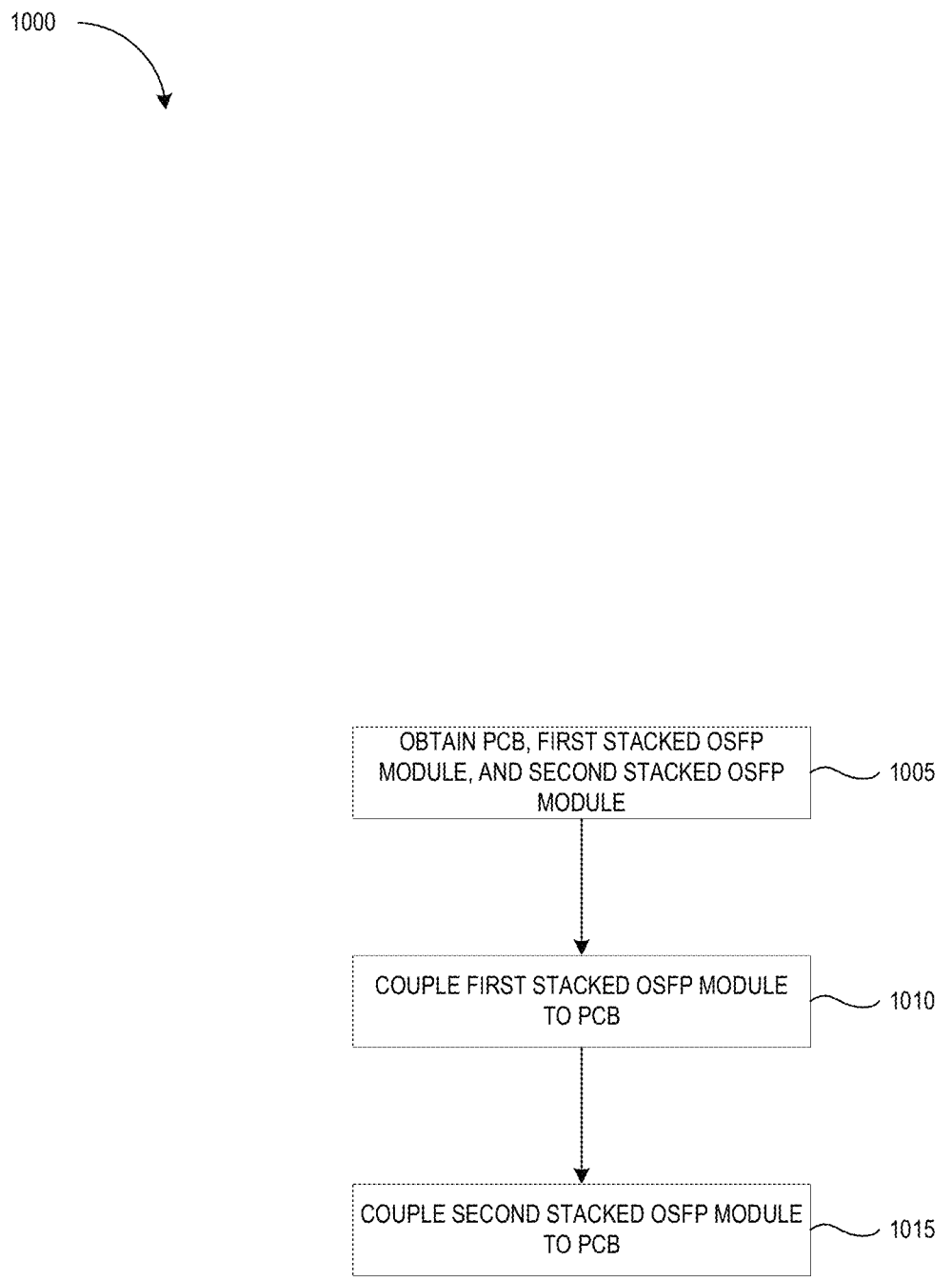
FIG. 10 is a flow diagram of a method of assembling a network device in accordance with one or more embodiments of the present disclosure.

FIG. 10 is a flow diagram of a method of assembling a network device in accordance with one or more embodiments of the present disclosure. It should be appreciated that the blocks of the method 1000 in FIG. 10 can be performed in differing orders, groupings, or subsets than shown in FIG. 10, for various purposes or user preferences. At block 1005, a PCB, a first dual stacked OFSP module, and a second stacked OSFP module are obtained. The first dual stacked OSFP module includes two OSFP modules that are stacked or adjacent to each other, as discussed above. The second dual stacked OSFP module includes two OSFP modules that are stacked or adjacent to each other, as discussed above. At block 1010, the first dual stacked OSFP module is coupled to a top surface of the PCB. For example, a first set of connection pins of first dual stacked OSFP module may be press fit into vias in the PCB. In another example, a first set of connection pins of first dual stacked OSFP module may be coupled to (e.g., soldered to) pads (or other surface mount connections) of the PCB. At least a portion of the bottom of the first dual stacked OSFP module (e.g., a portion of the housing) may be flush against and/or parallel to the top surface of the PCB. At block 1015, the second dual stacked OSFP module is coupled to a bottom surface of the PCB. For example, a second set of connection pins of second dual stacked OSFP module may be press fit into vias in the PCB. In another example, a second set of connection pins of first dual stacked OSFP module may be coupled to (e.g., soldered to) pads (or other surface mount connections) of the PCB. At least a portion of the bottom of the second dual stacked OSFP module (e.g., a portion of the housing) may be flush against and/or parallel to the top surface of the PCB.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. In addition, the term "set" includes one or more items within the set. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A network device, comprising:
a printed circuit board (PCB);
a first dual stacked octal small format pluggable (OSFP) module coupled to the PCB on a top surface of the PCB using a first set of connection pins aligned with a first set of vias of the PCB, wherein the first dual stacked OSFP module comprises two OSFP modules that are vertically stacked; and
a second dual stacked OSFP module coupled to the PCB on a bottom surface of the PCB using a second set of connection pins aligned with a second set of vias of the PCB, wherein:
the second dual stacked OSFP module comprises two OSFP modules that are vertically stacked;
a first bottom of the first dual stacked OSFP module is flush against the top surface of the PCB;
a second bottom of the second dual stacked OSFP is flush against the bottom surface of the PCB; and
the first set of vias is offset from the second set of vias.

2. The network device of claim 1, wherein a first center of the first dual stacked OSFP module and a second center of the second dual stacked OSFP module are aligned along a same vertical axis.

3. The network device of claim 1, wherein the first dual stacked OSFP module and the second dual stacked OSFP module form a column of four OSFP modules.

4. The network device of claim 1, wherein a first housing of the first dual stacked OSFP module is longer than a second housing of the second dual stacked OSFP module.

5. The network device of claim 1, wherein the first set of connection pins for the first dual stacked OSFP module is a reverse image of the second set of connection pins for the second dual stacked OSFP module.

6. A network element, comprising:
a chassis configured to house a plurality of network devices;
a first network device housed within the chassis, the first network device comprising: a printed circuit board (PCB);
a first dual stacked octal small format pluggable (OSFP) module coupled to the PCB on a top surface of the PCB using a first set of connection pins aligned with a first set of vias of the PCB, wherein the first dual stacked OSFP module comprises two OSFP modules that are vertically stacked; and
a second dual stacked OSFP module coupled to the PCB on a bottom surface of the PCB using a second set of connection pins aligned with a second set of vias of the PCB, wherein:
the second dual stacked OSFP module comprises two OSFP modules that are vertically stacked;
a first bottom of the first dual stacked OSFP module is flush against the top surface of the PCB;
a second bottom of the second dual stacked OSFP is flush against the bottom surface of the PCB; and
the first set of vias is offset from the second set of vias.

7. The network element of claim 6, wherein a first center of the first dual stacked OSFP module and a second center of the second dual stacked OSFP module are aligned along a same vertical axis.

8. The network element of claim 6, wherein the first dual stacked OSFP module and the second dual stacked OSFP module form a column of four OSFP modules.

9. The network element of claim 6, wherein a first housing of the first dual stacked OSFP module is longer than a second housing of the second dual stacked OSF module.

10. A method, comprising:
obtaining a printed circuit board (PCB);
obtaining a first dual stacked octal small format pluggable (OSFP) module, wherein the first dual stacked OSFP module comprises two OSFP modules that are vertically stacked;
obtaining a second dual stacked OSFP module, wherein the second dual stacked OSFP module comprises two OSFP modules that are vertically stacked;
coupling the first dual stacked to a top a top surface of the PCB using a first set of connection pins aligned with a first set of vias of the PCB; and
coupling the second dual stacked to a bottom surface of the PCB using a second set of connection pins aligned with a second set of vias of the PCB, wherein:
a first bottom of the first dual stacked OSFP module is flush against the top surface of the PCB;
a second bottom of the second dual stacked OSFP is flush against the bottom surface of the PCB; and
the first set of vias is offset from the second set of vias.

11. The network device of claim 6, wherein the first set of connection pins for the first dual stacked OSFP module is a reverse image of the second set of connection pins for the second dual stacked OSFP module.

12. The method of claim 10, wherein a first center of the first dual stacked OSFP module and a second center of the second dual stacked OSFP module are aligned along a same vertical axis after said coupling the first dual stacked to the top surface of the PCB and said coupling the second dual stacked to the bottom surface of the PCB.

13. The method of claim 10, wherein a first housing of the first dual stacked OSFP module is longer than a second housing of the second dual stacked OSF module.

14. The method of claim 10, wherein the first set of connection pins for the first dual stacked OSFP module is a reverse image of the second set of connection pins for the second dual stacked OSFP module.

* * * * *